US008856948B1

(12) United States Patent
Robison et al.

(10) Patent No.: US 8,856,948 B1
(45) Date of Patent: Oct. 7, 2014

(54) DISPLAYING PRIVATE INFORMATION ON PERSONAL DEVICES

(71) Applicant: Google Inc., Mountain View, CA (US)

(72) Inventors: Austin Robison, Sunnyvale, CA (US); Alexander Faaborg, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/139,524

(22) Filed: Dec. 23, 2013

(51) Int. Cl.
*G06F 21/00* (2013.01)
*G06F 21/60* (2013.01)

(52) U.S. Cl.
CPC ........................ *G06F 21/60* (2013.01)
USPC .......................................................... 726/26

(58) Field of Classification Search
CPC ......... H04W 12/02; G06F 21/84; G06F 21/60
USPC ............................................................ 726/26
See application file for complete search history.

(56) References Cited

U.S. PATENT DOCUMENTS

| | | | |
|---|---|---|---|
| 5,493,692 A | | 2/1996 | Theimer et al. |
| 6,597,328 B1 * | | 7/2003 | Stern et al. .......... 345/9 |
| 6,874,127 B2 | | 3/2005 | Newell et al. |
| 8,344,998 B2 | | 1/2013 | Fitzgerald et al. |
| 8,502,780 B1 * | | 8/2013 | Park ............... 345/165 |
| 8,515,505 B1 | | 8/2013 | Pattikonda |
| 8,600,120 B2 | | 12/2013 | Gonion et al. |
| 2006/0093998 A1 | | 5/2006 | Vertegaal |
| 2007/0067852 A1 * | | 3/2007 | James .............. 726/28 |
| 2008/0055194 A1 | | 3/2008 | Baudino et al. |
| 2008/0318616 A1 * | | 12/2008 | Chipalkatti et al. ....... 455/550.1 |
| 2010/0056113 A1 * | | 3/2010 | Silverman ................ 455/413 |
| 2010/0205667 A1 * | | 8/2010 | Anderson et al. ............. 726/19 |
| 2010/0304766 A1 * | | 12/2010 | Goyal ................ 455/466 |
| 2011/0241983 A1 * | | 10/2011 | Chang ................... 345/156 |
| 2011/0321143 A1 * | | 12/2011 | Angaluri et al. ................. 726/6 |
| 2012/0026274 A1 * | | 2/2012 | Baker et al. .............. 348/14.01 |
| 2012/0088548 A1 * | | 4/2012 | Yun et al. ............... 455/557 |
| 2012/0092436 A1 * | | 4/2012 | Pahud et al. ............ 348/14.02 |
| 2012/0131471 A1 * | | 5/2012 | Terlouw et al. .............. 715/741 |
| 2012/0314852 A1 * | | 12/2012 | Suri et al. .............. 379/114.01 |
| 2013/0069978 A1 * | | 3/2013 | Tanaka et al. ............. 345/619 |
| 2013/0151620 A1 * | | 6/2013 | Deshpande et al. .......... 709/204 |
| 2013/0156331 A1 * | | 6/2013 | Kurabayashi et al. ........ 382/224 |
| 2013/0222270 A1 | | 8/2013 | Winkler et al. |
| 2013/0222271 A1 | | 8/2013 | Alberth et al. |

(Continued)

OTHER PUBLICATIONS

Arthur et al. "Privacy-aware shared UI toolkit for nomadic environments", Software—Practice and Experience, 2011. 28 pgs.

(Continued)

*Primary Examiner* — David Garcia Cervetti
(74) *Attorney, Agent, or Firm* — Shumaker & Sieffert, P.A.

(57) ABSTRACT

A computing device is described that includes one or more processors and at least one module operable by the one or more processors to determine whether the computing device is currently designated to display private information, receive an incoming communication, and determine that the incoming communication includes content that is private information. The at least one module is further operable by the one or more processors to, if the computing device is currently designated to display private information, output, for display, an indication of the incoming communication, and, if the computing device is not currently designated to display private information, refrain from outputting, for display, the indication of the incoming communication.

21 Claims, 5 Drawing Sheets

(56) References Cited

U.S. PATENT DOCUMENTS

| | | | | |
|---|---|---|---|---|
| 2013/0276061 | A1* | 10/2013 | Chebiyyam et al. | 726/3 |
| 2013/0278484 | A1* | 10/2013 | Hwang et al. | 345/2.3 |
| 2013/0307870 | A1* | 11/2013 | Ashbrook | 345/629 |
| 2013/0316687 | A1* | 11/2013 | Subbaramoo et al. | 455/418 |
| 2014/0019873 | A1* | 1/2014 | Gupta et al. | 715/744 |

OTHER PUBLICATIONS

Horowitz, "Hide SMS & iMessage Previews from the Lock Screen on iPhone", OSXDaily [online]. Jul. 10, 2012. Retrieved from the Internet: <http://osxdaily.com/2012/07/10/hide-sms-imessage-previews-from-the-lock-screen-on-iphone/> 4 pgs.

Huang et al. "Semi-Public Displays for Small, Co-located Groups", CHI 2003: New Horizons, vol. No. 5, Issue No. 1, pp. 49-56.

Shanklin, "Review: Pebble smartwatch", gizmag [online]. Sep. 8, 2013. Retrieved from the Internet: <http://www.gizmag.com/pebble-watch-review/28990/> 11 pgs.

"The Meteor smart watch", kreyos 2014 [online]. Retrieved from the Internet: <http://www.kreyos.com/?utm_source=indiegogo&utm_medium=web&utm_campaign=igg> 8 pgs.

Shah, "Casio G-Shock with High Brightness LED automatically illuminates the display when the user tilts the watch toward the eyes to check the time", Fareastgizmos [online]. Aug. 23, 2010. Retrieved from the Internet: <http://fareastgizmos.com/other_stuff/casio_gshock_with_high_brightnessied_automatically_illuminates_the_display_when_the_user_tilts_the_watch_toward$_{13}$ the_eye.php> 3 pgs.

* cited by examiner

DISPLAYING PRIVATE INFORMATION ON PERSONAL DEVICES

BACKGROUND

Mobile computing devices allow a user to perform a variety of functions, including various forms of communication and computing. For example, mobile computing devices may be capable of accessing the Internet, executing gaming applications, playing media, receiving messages, as well as providing functionality of a traditional cellular telephone. In some examples, a user may wear such mobile computing devices. However, people other than the user wearing the mobile computing device may be able to view information displayed by such wearable devices.

SUMMARY

In one example, a method includes determining, by a computing device, whether the computing device is currently designated to display private information by at least determining whether one or more individuals other than a user to whom the incoming communication is directed are likely to view the indication of the incoming communication if the indication of the incoming communication is output by the computing device, receiving, by the computing device, an incoming communication, and determining that the incoming communication includes content that is private information. The method further includes, if the computing device is currently designated to display private information, outputting, by the computing device and for display, an indication of the incoming communication, and, if the computing device is not currently designated to display private information, refraining from outputting, by the computing device and for display, the indication of the incoming communication.

In another example, a computing device includes one or more processors and at least one module operable by the one or more processors to determine whether the computing device is currently designated to display private information by at least determining whether one or more individuals other than a user to whom the incoming communication is directed are likely to view the indication of the incoming communication if the indication of the incoming communication is output by the computing device, receive an incoming communication, and determine that the incoming communication includes content that is private information. The at least one module is further operable by the one or more processors to, if the computing device is currently designated to display private information, output, for display, an indication of the incoming communication, and, if the computing device is not currently designated to display private information, refrain from outputting, for display, the indication of the incoming communication.

In an additional example, a computer-readable storage medium comprising instructions that, when executed, configure one or more processors of a computing system to determine whether the computing device is currently designated to display private information by at least determining whether one or more individuals other than a user to whom the incoming communication is directed are likely to view the indication of the incoming communication if the indication of the incoming communication is output by the computing device, receive an incoming communication, and determine that the incoming communication includes content that is private information. The instructions, when executed, further configure the one or more processors of the computing system to, if the computing device is currently designated to display private information, output, for display, an indication of the incoming communication, and, if the computing device is not currently designated to display private information, refrain from outputting, for display, the indication of the incoming communication.

The details of one or more examples of the disclosure are set forth in the accompanying drawings and the description below. Other features, objects, and advantages will be apparent from the description and drawings, and from the claims.

DETAILED DESCRIPTION

Techniques according to the disclosure may enable a computing device to selectively output public or private information in response to a determination that someone other than a user associated with the computing device and/or an intended recipient of the information is likely viewing the computing device. The computing device may, for example, use microphones and cameras to capture audio and video data, which the computing device analyzes to determine whether the user associated with the computing device is the only person likely to receive information output by the computing device. In some examples, a computing device may display the information when the user of the computing device is likely viewing the computing device and refrain from displaying the information when other people, in addition to or instead of, the user is likely viewing the computing device. In other examples, audio information, haptic information, graphical display information or other forms of output provided to a user may be selectively presented based on a determination whether the likely recipient currently using the computing device is indeed associated with the computing device. In this manner, techniques of this disclosure may reduce the likelihood of private information being unintentionally shared with other people.

Throughout the disclosure, examples are described where a computing device and/or a computing system may analyze information (e.g., locations, speeds, etc.) associated with a computing device only if the computing device receives permission from the user to analyze the information. For example, in situations discussed below in which the computing device may collect or may make use of information associated with the user, the user may be provided with an opportunity to provide input to control whether programs or features of the computing device can collect and make use of user information (e.g., information about a user's current location, current speed, etc.), or to dictate whether and/or how to the computing device may receive content that may be relevant to the user. In addition, certain data may be treated in one or more ways before it is stored or used by the computing device and/or computing system, so that personally-identifiable information is removed. For example, a user's identity may be treated so that no personally identifiable information can be determined about the user, or a user's geographic location may be generalized where location information is obtained (such as to a city, ZIP code, or state level), so that a particular location of a user cannot be determined. Thus, the user may have control over how information is collected about the user and used by the computing device.

Figure 1:
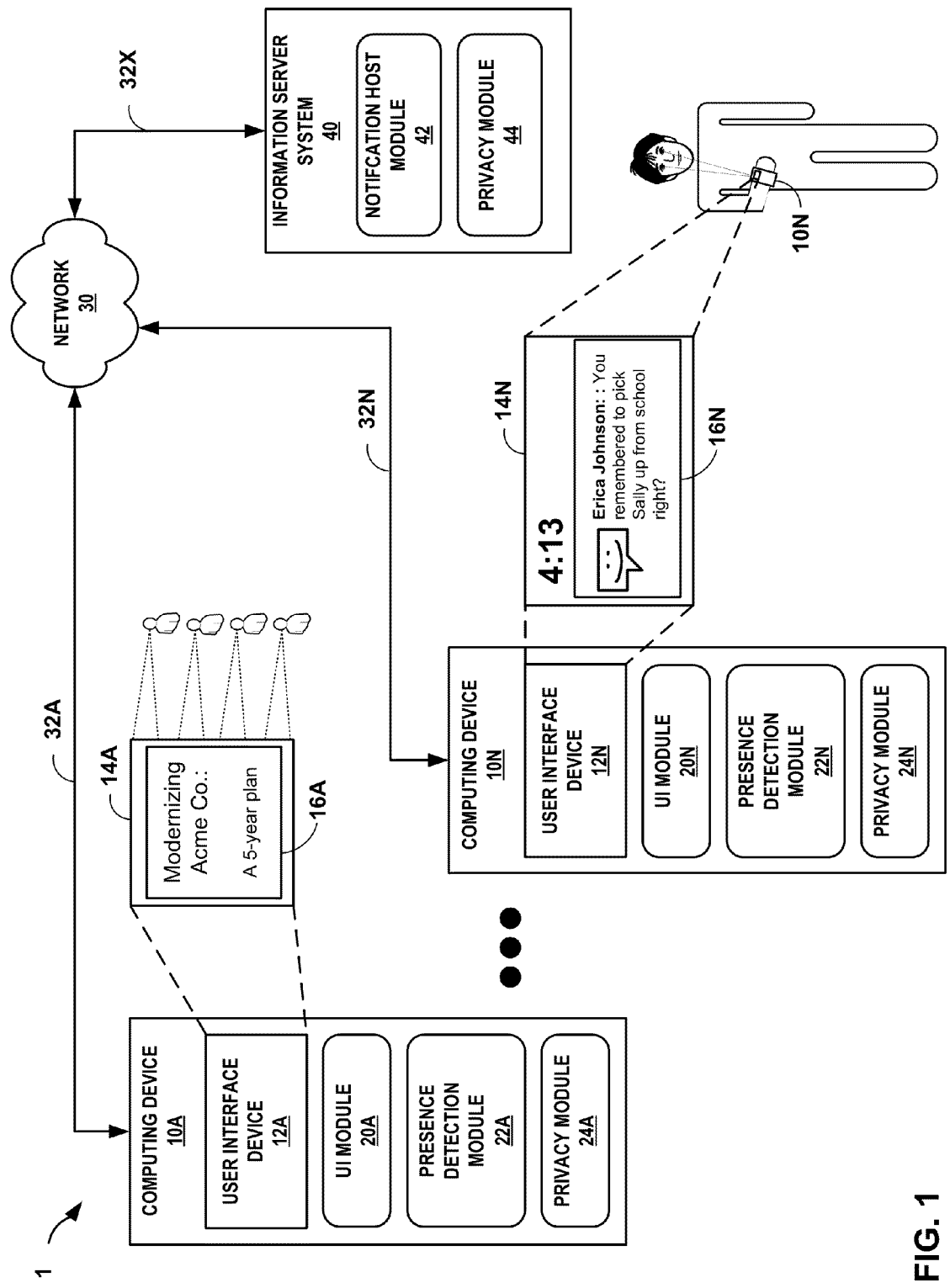
FIG. 1 is a block diagram illustrating an example system for managing the display of private information, in accordance with one or more techniques of the present disclosure.

FIG. 1 is a block diagram illustrating example system 1 for managing the display of private information, in accordance with one or more techniques of the present disclosure. As shown in the example of FIG. 1, system 1 includes computing devices 10A-10N (collectively, "computing devices 10"), information server system 40, and network 30.

Network 30 represents any public or private communication network, for instance, a cellular, Wi-Fi, and/or other type of network for transmitting data between computing devices. Computing devices 10 and information server system 40 may send and receive data across network 30 using any suitable communication techniques. For example, computing device 10A may be operatively coupled to network 30 using network link 32A, and computing device 10N may be operatively coupled to network 30 using network link 32N. Information server system 40 may be operatively coupled to network 30 by network link 32X. Network 30 may include network hubs, network switches, network routers, etc., that are operatively inter-coupled thereby providing for the exchange of information between computing devices 10 and information server system 40. In some examples, network links 32A-32N, and 32X (collectively, "network links 32") may be Ethernet, ATM or other network connections. Such connections may be wireless and/or wired connections.

In the example of FIG. 1, computing device 10A is a laptop computer and computing device 10N is a wearable computing device (e.g., a computerized watch, computerized eyewear, computerized gloves, etc.). However, in other examples, computing devices 10 may be any combination of tablet computers, mobile phones, personal digital assistants (PDA), laptop computers, gaming systems, media players, e-book readers, television platforms, automobile navigation systems, or any other types of mobile and/or non-mobile computing devices that are configured to receive notification data from information server system 40 and output an alert or otherwise provide an indication of the receipt of notification data.

As shown in FIG. 1, computing devices 10 each include respective user interface devices (UID) 12A-12N (collectively, "UIDs 12"). UIDs 12 of computing devices 10 may function as respective input and/or output devices for computing devices 10. UIDs 12 may be implemented using various technologies. For instance, UIDs 12 may function as input devices using presence-sensitive input screens, such as resistive touchscreens, surface acoustic wave touchscreens, capacitive touchscreens, projective capacitance touchscreens, pressure sensitive screens, acoustic pulse recognition touchscreens, or another presence-sensitive display technology. UIDs 12 may function as output (e.g., display) devices using any one or more display devices, such as liquid crystal displays (LCD), dot matrix displays, light emitting diode (LED) displays, organic light-emitting diode (OLED) displays, e-ink, or similar monochrome or color displays capable of outputting visible information to a user of computing devices 10. In some examples, the display devices can be physically separate from a presence-sensitive device included in computing devices 10.

UIDs 12 may each include respective presence-sensitive displays that may receive tactile input from a user of respective computing devices 10. UIDs 12 may receive indications of tactile input by detecting one or more gestures from a user (e.g., the user touching or pointing to one or more locations of UIDs 12 with a finger or a stylus pen). UIDs 12 may present output to a user, for instance at respective presence-sensitive displays. UIDs 12 may present the output as respective graphical user interfaces (e.g., user interfaces 14A-14N), which may be associated with functionality provided by computing devices 10. For example, UIDs 12 may present various user interfaces related to the functionality of computing platforms, operating systems, applications, and/or services executing at or accessible by computing devices 10 (e.g., electronic message applications, Internet browser applications, mobile or desktop operating systems, etc.). A user may interact with a user interface to cause computing devices 10 to perform respective operations relating to functions.

Computing devices 10 may each include corresponding user interface ("UI") modules 20A-20N (collectively, "UI modules 20"), presence detection modules 22A-22N (collectively, "presence detection modules 22"), and privacy modules 24A-24N (collectively, "privacy modules 24"). Modules 20, 22, and 24 may perform operations described using software, hardware, firmware, or a mixture of hardware, software, and firmware residing in and/or executing at respective computing devices 10. Computing devices 10 may each execute respective modules 20, 22, and 24 with one or more processors. Computing devices 10 may execute respective modules 20, 22, and 24 as one or more virtual machines executing on underlying hardware of computing devices 10. Modules 20, 22, and 24 may execute as one or more services or components of operating systems or computing platforms of computing devices 10. Modules 20, 22, and 24 may execute as one or more executable programs at application layers of computing platforms of computing devices 10. UIDs 12 and modules 20, 22, and 24 may be otherwise arranged remotely to and remotely accessible to respective computing devices 10, for instance, as one or more network services operating at network 30 in a network cloud.

Rather than automatically displaying a notification on the one of computing devices 10 that received the notification (e.g., computing device 10A), techniques of this disclosure enable computing device 10A to selectively output and redirect the notification based on whether the notification includes private information and whether computing device 10A is currently designated to output private information. Selectively outputting the notification may include selectively outputting audio information, haptic information, graphical display information or other forms of output provided to a user. In various instances, a device or system automatically determines whether a device is currently designated to output private information based on a current usage context of the device. In some examples, the current usage context of the device is appropriate for the output of private information when someone other than the intended recipient will likely not receive the private information. Whereas, the current content of the computing device may not be appropriate for the output of private information when someone other than or in addition to the intended recipient will likely receive the private information.

Computing device 10A may receive an indication of an incoming communication (e.g., from information system server 40) and provide the indication of the incoming communication to privacy module 24A. For example, computing device 10A may receive an incoming communication (e.g., from a spouse) asking whether the user remembered to pick up Sally from school. Privacy module 24A may determine that the incoming communication includes private information based on the sender (e.g., the user's spouse) and the inclusion of their daughter's name (e.g., "Sally") in the text of the incoming communication. Privacy module 24A may request presence information from presence detection module 22A to determine whether the user is likely in control of computing device 10A and whether the user or other people are likely viewing user interface device 12A.

Presence detection module 22A may receive information from one or more input devices (e.g., cameras, microphones, presence-sensitive input devices, etc.), from motion sensors (e.g., accelerometer, gyroscope, compass, etc.), from an operating system executing at computing device 10A, and from other software and/or hardware modules of computing device 10A. Using the received information, presence detection module 22A determines whether information output for display by computing device 10A (e.g., at user interface device 12A) will likely be viewed or otherwise observable by people other than a user associated with computing device 10A. That is, presence detection module 22A determines whether people, other than the user associated with computing device 10A, are present and may likely view information displayed by computing device 10A.

Privacy module 24A may receive an indication of whether information output for display by computing device 10A will likely be viewed or otherwise observable by people other than the user associated with computing device 10A. In some instances, regardless of whether the incoming communication includes private information, privacy module 24A may determine that, if information output for display by computing device 10A will likely be viewed or otherwise observable by people other than the user associated with computing device 10A, a notification of the incoming communication or the incoming communication itself should not be displayed by computing device 10A (e.g., based on a location of computing device 10A, a currently active application executing at computing device 10A, a configuration state of computing device 10A, etc.).

As one example, privacy module 24A may determine that computing device 10A is not currently designated to display private information based at least in part on determining that computing device 10A is currently being used for a presentation based on the current location of computing device 10A (e.g., at the user's workplace), the currently active application (e.g., presentation software), and the current configuration of computing device 10A (e.g., connected to an external display device, such as a projector). For example, privacy module 24A determines that user interface device 12A is currently outputting user interface 14A that includes presentation 16A. At least in part because privacy module 24A determines that computing device 10A is currently be used for a presentation (i.e., not currently designated to display private information), privacy module 24A determines that no indication of the incoming communication should be displayed by computing device 10A. Accordingly, computing device 10A automatically refrains from outputting an indication of the incoming communication.

In various instances, privacy modules 24 may include functionality to analyze an incoming communication to determine that the incoming communication includes private information. Private information, as used in this disclosure, includes any information that a user of a device would prefer not be shared with other persons. Public, or non-private, information, as used in this disclosure, includes any information other than private information. Privacy modules 24 may receive data from other components of computing devices 10. For instance, privacy modules 24 may receive user presence information from a respective one of presence detection modules 22. Privacy modules 24 may send data to other components of computing devices 10. For instance, privacy modules 24 may send a graphical indication that includes non-private information to UI modules 20.

In situations in which the systems discussed herein, such as privacy modules 24, may collect personal information about the user, or may make use of the user's personal information, the user may be provided with an opportunity to control whether, and to what extent, programs or features collect the user's information (e.g., information about the user's social network, social actions or activities, profession, the user's preferences, or the user's current location), or to control whether and/or how to receive content from the content server that may be more relevant to the user. In addition, certain data may be treated in one or more ways before it is stored or used, so that personally identifiable information is removed. For example, the user's identity may be treated so that no personally identifiable information can be determined for the user, or the user's geographic location may be generalized where location information is obtained (such as to a city, ZIP code, or state level), so that a particular location of the user cannot be determined. Thus, the user may have control over how information is collected about the user and used by a content server.

Privacy module 24A may receive the indication of the incoming communication and determine that the incoming communication includes private information. Privacy module 24A may determine that the incoming communication includes private information based on a sender of the incoming communication (e.g., a doctor, a lawyer, an accountant, a spouse, a close friend, etc.), content of the incoming communication (e.g., text of the incoming communication, audio of the incoming communication, content of images included in the incoming communication, etc.), a privacy flag associated with the incoming communication (e.g., the sender manually indicated that the incoming communication as private), one or more predefined privacy settings (e.g., time of day, geographical location of computing device 10A, list of non-private senders, and/or list of private senders) etc. In some examples, privacy module 24A may determine that the incoming communication includes private information based on any combination of factors. As one example, privacy module 24A may determine that an incoming communication that indicates a level of a battery of computing device 10A or other system information does not include private information based on the type of information (i.e., system information) included in the incoming communication. As another example, privacy module 24A may determine that an incoming communication includes private information based on a current location of computing device 10A (e.g., the user's workplace).

While privacy modules 24 are described as determining whether the incoming communication includes private information and whether or not a respective one of computing devices 10 is currently designated to display private information, information server system 40 may perform one or more of these actions and may provide the one of computing devices 10 to which the incoming communication is directed with an indication of whether the particular computing device 10 is currently designated to display private information and/or whether the incoming communication includes private information. For example, notification host module 42 may receive an incoming communication (e.g., an email or text message) from another server. Privacy module 44 may analyze the incoming communication to determine whether or not the incoming communication includes private information (e.g., based on keywords, sender, type of incoming communication, visual content included in the incoming communication, etc.).

In instances where privacy module 24A determines that computing device 10A is not currently designated to display private information, privacy module 24A may cause computing device 10A and/or information server system 40 to identify a different computing device associated with the user (e.g., computing device 10N) and direct at least an indication of the incoming communication to the identified different computing device. In various instances, information server system 40 may maintain information about one or more of computing devices 10 associated with the same user and may forward an incoming communication or an indication of an incoming communication to any of computing devices 10. Similarly, computing device 10A may identify one or more other computing devices of computing devices 10 that are communicably coupled to computing device 10A (e.g., via Wi-Fi, Bluetooth, etc.) and forward the incoming communication to the other one(s) of computing devices 10.

As one example, computing device 10A may determine that computing device 10N is operatively coupled to computing device 10A (e.g., via Bluetooth) and may forward at least an indication of the incoming communication to computing device 10N. In some instances, computing device 10A may also forward an indication of whether the incoming communication includes private information to computing device 10N. As another example, computing device 10A sends, to information server system 40, a message indicating that computing device 10A is not currently designated to display private information. Responsive to receiving the message, information server system 40 determines one or more other computing devices associated with the same user as is associated with computing device 10A (e.g., computing device 10N) and identifies one of the other computing devices as a possible alternative computing device to display at least an indication of the incoming communication. In either example, computing device 10N receives at least an indication of the incoming communication.

Responsive to receiving the incoming communication, computing device 10N may determine whether to display a notification of the incoming communication and/or the incoming communication based at least in part on whether the incoming communication includes private information and whether computing device 10N is currently designated to display private information. In instances where computing device 10N receives an indication of whether the incoming communication includes private information from computing device 10A or information server system 40, privacy module 24N of computing device 10N may determine that the incoming communication includes private information based on the relieved indication. In some examples, privacy module 24N may determine whether the incoming communication includes private information by at least analyzing the content of the incoming communication similar to that discussed above with respect to privacy module 24A.

Privacy module 24N may also determine whether computing device 10N is currently designated to display private information by, for example, determining whether anyone other than the user associated with computing device 10N is likely viewing a display device (e.g., user interface device 12N) associated with computing device 10N. In some examples, privacy module 24N may determine whether the user associated with computing device 10N is actively viewing the display device associated with computing device 10N and/or whether the user is actively using computing device 10N. In instances where computing device 10N determines that the user is likely the only person who is viewing the display device associated with computing device 10N, privacy module 24N may determine that computing device 10N is currently designated to display private information. In these instances, user interface device 12N may output user interface 14N that includes at least indication 16N of the incoming communication. In various examples, indication 16N may include at least a portion of the private information included in the incoming communication.

In this manner, techniques of this disclosure may enable a computing device to selectively output information based, at least in part, on whether the intended recipient of the information is likely to be the only person who views the information. By selectively outputting information, techniques of this disclosure may reduce the likelihood of private information being unintentionally shared with other people.

Figure 2:
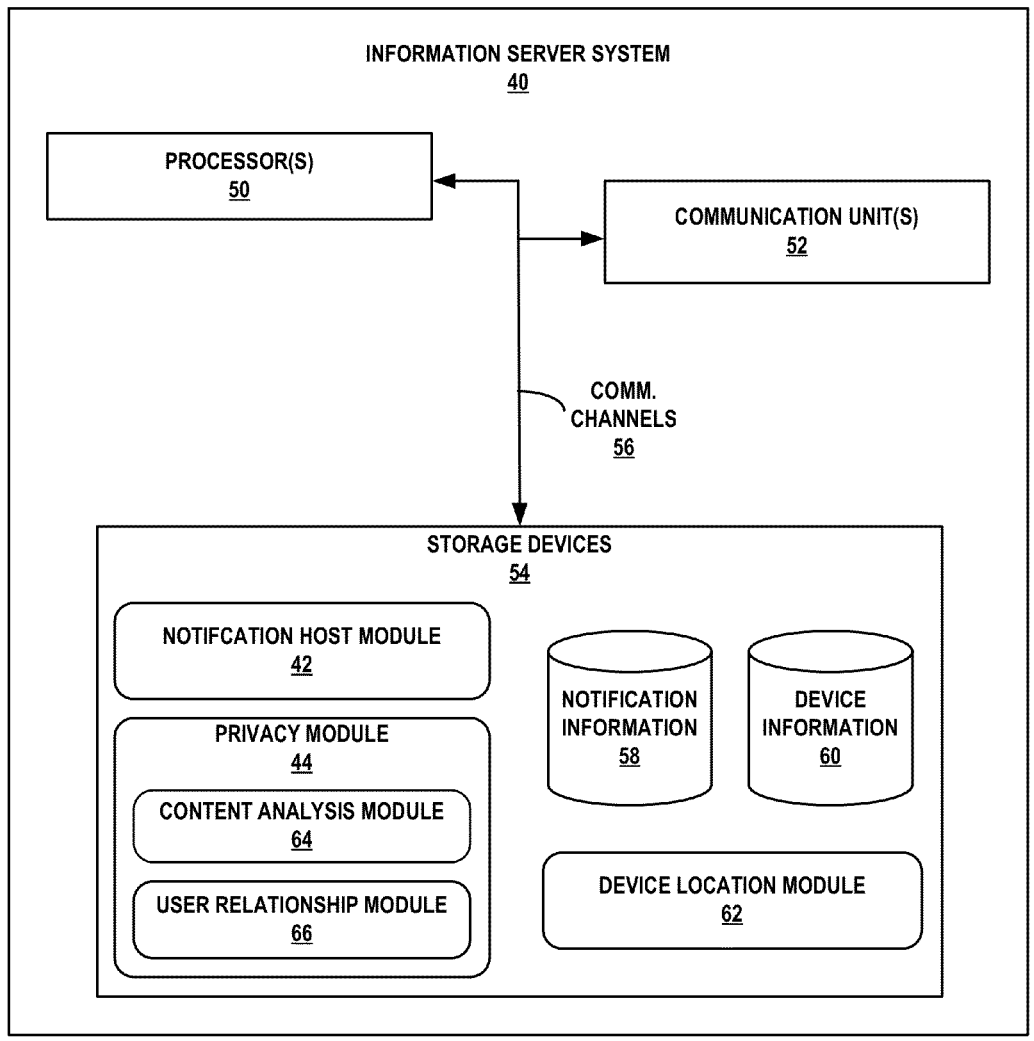
FIG. 2 is a block diagram illustrating an example computing system that determines whether to output private information to a computing device, in accordance with one or more techniques of the present disclosure.

FIG. 2 is a block diagram illustrating an example computing system that determines whether to output private information to a computing device, in accordance with one or more techniques of the present disclosure. Information server system 60 of FIG. 2 is described below within the context of FIG. 1. FIG. 2 illustrates only one particular example of information server system 60, and many other examples of information server system 40 may be used in other instances and may include a subset of the components included in example information server system 40 or may include additional components not shown in FIG. 2.

As shown in the example of FIG. 2, information server system 40 includes one or more processors 50, one or more communication units 52, and one or more storage devices 54. Storage devices 54 of information server system 40 include notification host module 42, privacy module 44, and device location module 62. Storage devices 54 of information server system 40 further include notification information data store 58, and device information data store 60. Communication channels 56 may interconnect each of the components 50, 52, and 54 for inter-component communications (physically, communicatively, and/or operatively). In some examples, communication channels 56 may include a system bus, a network connection, an inter-process communication data structure, or any other method for communicating data.

One or more communication units 52 of information server system 40 may communicate with external computing devices, such as one or more of computing devices 10, by transmitting and/or receiving network signals on one or more networks, such as network 30. For example, information server system 40 may use communication unit 52 to transmit and/or receive radio signals via links 32 to exchange information with one or more of computing devices 10. Examples of communication unit 52 include a network interface card (e.g. such as an Ethernet card), an optical transceiver, a radio frequency transceiver, a GPS receiver, or any other type of device that can send and/or receive information. Other examples of communication units 52 may include short wave radios, cellular data radios, wireless Ethernet network radios, as well as universal serial bus (USB) controllers.

One or more storage devices 54 within information server system 40 may store information for processing during operation of information server system 40 (e.g., information server system 40 may store data accessed by modules 42, 44, and 62 during execution at information server system 40). In some examples, storage devices 54 are a temporary memory, meaning that a primary purpose of storage devices 54 is not long-term storage. Storage devices 54 on information server system 40 may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Storage devices 54, in some examples, also include one or more computer-readable storage media. Storage devices 54 may be configured to store larger amounts of information than volatile memory. Storage devices 54 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage devices 54 may store program instructions and/or data associated with modules 42, 44, and 62.

One or more processors 50 may implement functionality and/or execute instructions within information server system 40. For example, processors 50 of information server system 40 may receive and execute instructions stored by storage devices 54 that execute the functionality of modules 42, 44, and 62. These instructions executed by processors 50 may cause information server system 40 to store information, within storage devices 54 during program execution. Processors 50 may execute instructions of modules 42, 44, and 62 to provide notification and device information to one or more computing devices (e.g., computing devices 10 of FIG. 1). That is, modules 42, 44, and 62 may be operable by processors 50 to perform various actions or functions of information server system 40.

Data stores 58 and 60 represent any suitable storage medium for storing data related to notification data and contextual information. For example, notification information data store 58 may store notification data received by notification host module 42 and device information data store 60 may store information about one or more devices associated with particular users, which may be received from one or more of computing devices 10.

The notification information stored at data store 58 may be sorted, organized, and/or accessed by notification host module 42 according to various attributes associated with the notification information. For instance, in addition to including content (e.g., information associated with the notification information such as text, video, images, etc. associated with a message, calendar reminder, etc.), each portion of notification information received by information server system 40 may include one or more attributes that notification host module 42 uses for determining when to output the notification information and/or which of computing devices 10 to route or deliver the notification information.

One attribute included in the notification information may include a user identifier, such as a user name, account name, telephone number, network identifier, e-mail address, etc. that indicates a user recipient associated with the notification information for which computing devices 10 may output an alert based on the notification information and/or otherwise provide access to information associated with the notification information. Notification host module 42 may store received notification information at data store 58 according to the user identifier and may retrieve notification data from data store 58 by querying notification data based on the user identifier.

In some examples, the notification information may include a sender identifier that indicates an origin of the incoming communication. For example, e-mail or instant message notification data may include an attribute that specifies the e-mail address or instant message account of a user "sender" associated with the incoming communication. In other words, the sender identifier may indicate an account name associated with a person that typed the e-mail or instant message associated with the notification information stored at notification information 58.

In some examples, the notification information stored at notification information data store 58 may include an indication of whether or not the incoming communication associated with the notification information includes private information. In order to determine whether the incoming communication includes private information, privacy module 44 may analyze various attributes of the incoming communication and/or content of the incoming communication. As one example, content analysis module 64 of privacy module 44 may analyze textual content of the incoming communication to determine if one or more keywords or phrases indicative of private information are included within the text of the incoming communication. In some examples, privacy module 44 may also analyze image content of the incoming communication. For example, privacy module 44 may analyze a picture, video, or other image data to determine if the image content includes objects indicative of private As another example, user relationship module 66 may determine a relationship between the sender and the recipient of the incoming communication. The relationship may be familial, spousal, or other interpersonal-type relationship between the second and recipient. In some instances, the relationship may be determined based on social network information, stored contact information, user-configured relationship information, etc. information. Based on the relationship between the sender and the recipient, user relationship module 66 may determine that the incoming communication includes private information. For example, if the sender and recipient are married, the incoming communication may be marked as a private communication. As another example, if the sender is a business and the recipient is a customer of the business, user relationship module 66 may determine that the incoming communication does not include private information.

Privacy module 44 may analyze one or more different determinations of whether the incoming communication includes private information before making a final determination. For example, user relationship module 66 may determine that the incoming communication does not include private information based on the relationship between the sender and the recipient while content analysis module 64 determines that the textual content of the incoming communication does include private information. Privacy module 44 may analyze both determinations and may apply weightings to the determinations to make a final determination. As one example, privacy module 44 may apply a heavier weighting to the determination made by content analysis module 64 than the determination made by user relationship module 66. As another example, privacy module 44 may be configured such that if any analysis of the incoming communication results in a determination that the incoming communication includes private information, privacy module 44 determines that the incoming communication includes private information, regardless of whether the result of any or all other initial determinations indicate that the incoming communication includes private information.

Privacy module 44 may also determine whether or not one or more of computing devices 10 associated with the recipient of the incoming communication is currently designated to display private information. As one example, privacy module 44 may receive location information for each of computing devices 10 associated with the recipient from device location module 62. Device location module 62 may request current location information of computing devices 10 associated with the recipient of the incoming communication (e.g., in response to information server system 40 receiving the incoming communication) and provide the current location information to privacy module 44. In some examples, device location module 62 may associate a location type to a current location of one of computing devices 10. For example, if computing device 10A is at a location corresponding to a workplace of the recipient, device location module 62 may apply a "work" location type to the location of computing device. As another example, if computing device 10A is at a location corresponding to a home of the recipient, device location module 62 may apply a "home" location type to the location of computing device 10A. As another example, if computing device 10A is at a location corresponding to a public business, device location module 62 may apply a "public" location type to the location of computing device 10A. In any of the examples, device location module 62 may provide, to privacy module 44, a respective location type in addition to or instead of a respective current location of one or more of computing devices 10.

Privacy module 44 may also determine whether one of computing devices 10 is currently designated to display private information based at least in part on a type of the one of computing devices 10. For example, if computing device 10A is a laptop computer, privacy module 44 may determine that it is more likely that computing device 10A is currently being viewed by more than one person and determine that computing device 10A is not currently designated to display private information. As another example, if computing device 10N is a wearable computing device (e.g., a watch, eyeglasses, ring, gloves, etc.), privacy module 44 may determine that it is less likely that computing device 10N is currently being viewed by anyone other than the user and determine that computing device 10N is currently designated to display private information.

Privacy module 44 may select which one or more of computing devices 10 to send the incoming communication based at least in part on which ones of computing device 10 are currently designated to display private information. For example, if computing device 10A is not currently designated to display private information and computing device 10N is currently designated to display private information, information server system 40 may send at least an indication of the incoming communication to computing device 10N. In some instances, information server system 40 may also send an indication of whether or not privacy module 44 determined the particular computing device 10 is currently designated to display private information. Information server system 40 may also send an indication of whether or not the incoming communication includes private information. That is, information server system 40 may send an incoming communication, an indication of whether or not the destination computing device 10 is currently designated to display private information (i.e., as determined by privacy module 44), an indication of whether or not the incoming communication includes private information, or any combination thereof.

Figure 3:
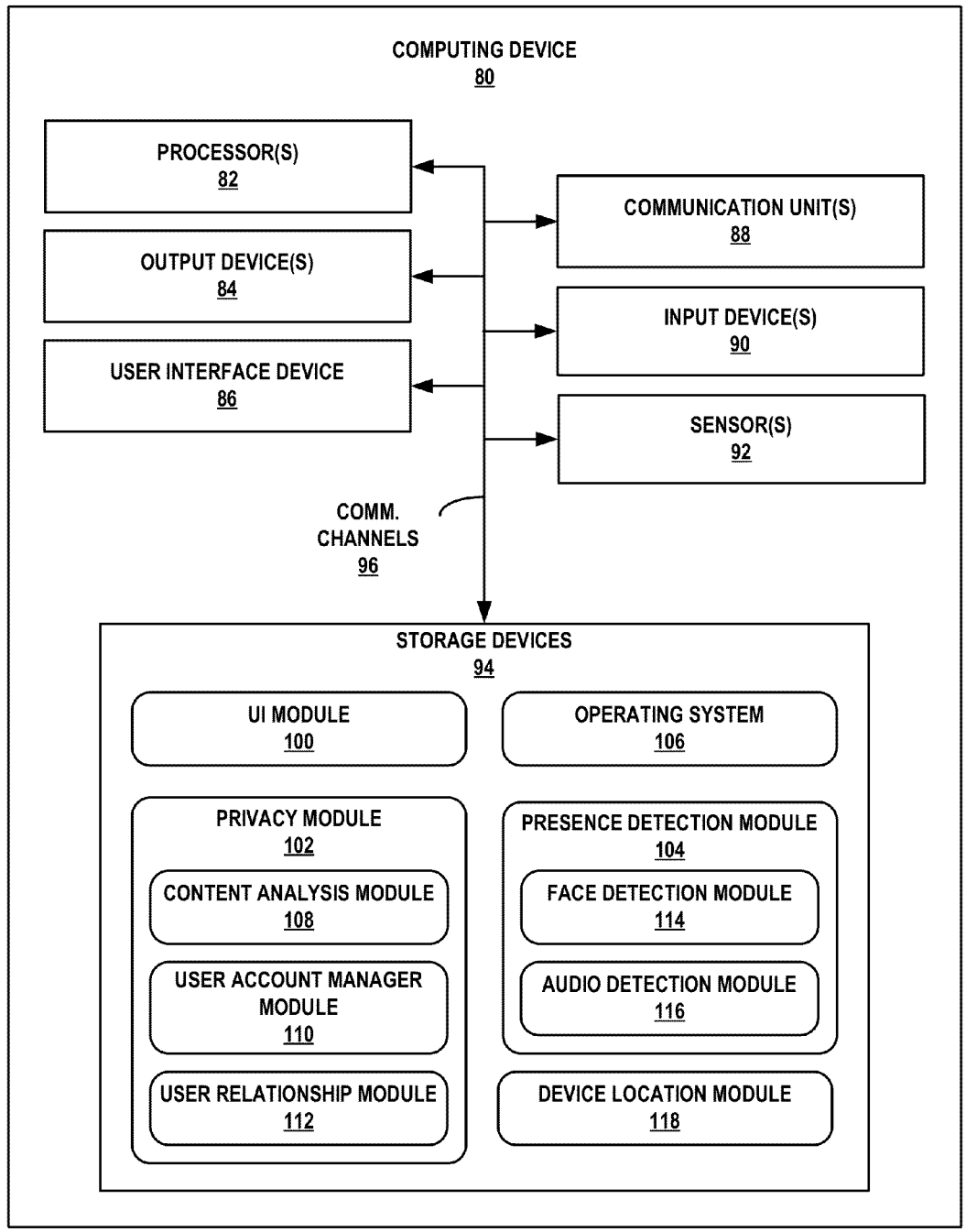
FIG. 3 is a block diagram illustrating a mobile computing device that determines whether to display private information, in accordance with one or more techniques of the present disclosure.

FIG. 3 is a block diagram illustrating a mobile computing device that determines whether to display private information, in accordance with one or more techniques of the present disclosure. Computing device 80 of FIG. 3 is described below within the context of FIG. 1. FIG. 3 illustrates only one particular example of computing device 80, and many other examples of computing device 80 may be used in other instances and may include a subset of the components included in example computing device 80 or may include additional components not shown in FIG. 3.

As shown in the example of FIG. 3, computing device 80 includes one or more processors 82, one or more output devices 84, user interface device 86 ("UID 86"), one or more communication units 88, one or more input devices 90, one or more sensors 92, and one or more storage devices 94. Storage devices 94 of computing device 80 also include UI module 100, privacy module 102, presence detection module 104, and operating system 106. Computing device 80 can include additional components that, for clarity, are not shown in FIG. 3. For example, computing device 80 can include a battery to provide power to the components of computing device 80. Similarly, the components of computing device 80 shown in FIG. 3 may not be necessary in every example of computing device 80. For example, in some configurations, computing device 80 may not include output devices 84.

Communication channels 96 may interconnect each of the components 82, 84, 86, 88, 90, 92 and 94 for inter-component communications (physically, communicatively, and/or operatively). In some examples, communication channels 96 may include a system bus, a network connection, an inter-process communication data structure, or any other method for communicating data.

One or more processors 82 may implement functionality and/or execute instructions within computing device 80. For example, processors 82 on computing device 80 may receive and execute instructions stored by storage devices 94 that execute the functionality of modules 100, 102, and 104. These instructions executed by processors 82 may cause computing device 80 to read/write/etc. information, such as one or more data files stored within storage devices 94 during program execution. Processors 82 may execute instructions of modules 100, 102, 104, and 106 to cause UID 86 to output one or more graphical indications of incoming communications for display at UID 86 as content of a user interface. That is, modules 100, 102, and 104 may be operable by processors 82 to perform various actions or functions of computing device 80, for instance, causing UID 86 to a present a graphical user interface at UID 86.

One or more communication units 88 of computing device 80 may communicate with external devices via one or more wired and/or wireless networks by transmitting and/or receiving network signals on the one or more networks. Examples of communication unit 88 include a network interface card (e.g. such as an Ethernet card), an optical transceiver, a radio frequency transceiver, a GPS receiver, or any other type of device that can send and/or receive information. Other examples of communication units 88 may include short wave radios, cellular data radios, wireless network radios, as well as universal serial bus (USB) controllers.

One or more output devices 84 of computing device 80 may generate output. Examples of output are tactile, audio, and video output. Output devices 84 of computing device 80, in one example, includes a presence-sensitive display, sound card, video graphics adapter card, speaker, cathode ray tube (CRT) monitor, liquid crystal display (LCD), or any other type of device for generating output to a human or machine.

One or more input devices 90 of computing device 80 receive input. Examples of input are tactile, audio, and video input. Input devices 90 of computing device 80, in one example, includes a presence-sensitive display, touch-sensitive screen, mouse, keyboard, voice responsive system, video camera, microphone, or any other type of device for detecting input from a human or machine.

In some examples, UID 86 of computing device 80 may include functionality of input devices 90 and/or output devices 84. In the example of FIG. 3, UID 86 may be or may include a presence-sensitive input device. In some examples, a presence sensitive input device may detect an object at and/or near a screen. As one example range, a presence-sensitive input device may detect an object, such as a finger or stylus that is within 2 inches or less of the screen. The presence-sensitive input device may determine a location (e.g., an (x,y) coordinate) of a screen at which the object was detected. In another example range, a presence-sensitive input device may detect an object six inches or less from the screen and other ranges are also possible. The presence-sensitive input device may determine the location of the screen selected by a user's finger using capacitive, inductive, and/or optical recognition techniques. In some examples, presence sensitive input device also provides output to a user using tactile, audio, or video stimuli as described with respect to output device 84, e.g., at a display. In the example of FIG. 3, UID 86 presents a graphical user interface, such as graphical user interfaces 14 of FIG. 1.

While illustrated as an internal component of computing device 80, UID 86 also represents and external component that shares a data path with computing device 80 for transmitting and/or receiving input and output. For instance, in one example, UID 86 represents a built-in component of computing device 80 located within and physically connected to the external packaging of computing device 80 (e.g., a screen on a mobile phone). In another example, UID 86 represents an external component of computing device 80 located outside and physically separated from the packaging of computing device 80 (e.g., a monitor, a projector, etc. that shares a wired and/or wireless data path with a tablet computer).

Sensors 92 may be configured to measure the movement of computing device 80 and may collect other information associated with computing device 80. For instance, sensors 92 may be configured to measure the position, rotation, velocity, and/or acceleration of computing device 80. A user associated with computing device 80 may interact with computing device 80 by wearable computing device 80. Examples of sensors 92 that detect and/or measure movement of computing device 80 may include, but are not limited to, accelerometers and gyroscopes. Sensors 92 may also include a clasp sensor (e.g., in examples where computing device 80 is a wearable computing device having a clasp), a galvanic skin response sensor, and any other type of sensor capable of collecting information related to computing device 80.

One or more storage devices 94 within computing device 80 may store information for processing during operation of computing device 80 (e.g., computing device 80 may store data that modules 100, 102, and 104 may access during execution at computing device 80). In some examples, storage device 48 is a temporary memory, meaning that a primary purpose of storage device 48 is not long-term storage. Storage devices 48 on computing device 10 may configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Storage devices 94, in some examples, also include one or more computer-readable storage media. Storage devices 94 may be configured to store larger amounts of information than volatile memory. Storage devices 94 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage devices 94 may store program instructions and/or information (e.g., data) associated with modules 100, 102, and 104 and operating system 106.

Operating system 106, in some examples, controls the operation of components of computing device 80. For example, operating system 106, in one example, facilitates the communication of UI module 100, privacy modules 102, and presence detection module 104 with processors 82, one or more output devices 84, user interface device 86 ("UID 86"), one or more communication units 88, one or more input devices 90, and one or more sensors 92. UI module 100, privacy module 102, and presence detection module 104 may each include program instructions and/or data that are executable by computing device 80 (e.g., by one or more processors 82). As one example, UI module 6 can include instructions that cause computing device 80 to perform one or more of the operations and actions described in the present disclosure.

UI module 100 may cause UID 86 to output a graphical user interface (e.g., graphical user interfaces 14A, 14N) for display, as a user of computing device 80 views output and/or provides input at UID 86. UI module 100 and UID 86 may receive one or more indications of input from a user as the user interacts with the graphical user interface, at different times and when the user and computing device 80 are at different locations. UI module 100 and UID 86 may interpret inputs detected at UID 86 (e.g., as a user provides one or more gestures at one or more locations of UID 86 at which the graphical user interface is displayed) and may relay information about the inputs detected at UID 86 to one or more associated platforms, operating systems, applications, and/or services executing at computing device 80, to cause computing device 80 to perform functions.

UI module 100 may receive information and instructions from one or more associated platforms, operating systems, applications, and/or services executing at computing device 80 (e.g., privacy module 102, presence detection module 104, etc.) for generating a graphical user interface. In addition, UI module 100 may act as an intermediary between the one or more associated platforms, operating systems, applications, and/or services executing at computing device 80 and various output devices of computing device 80 (e.g., speakers, LED indicators, audio or electrostatic haptic output device, etc.) to produce output (e.g., a graphic, a flash of light, a sound, a haptic response, etc.) with computing device 80.

Computing device 80 may receive, via communication units 88, an incoming message (e.g., from information system server 40 of FIG. 2). Prior to outputting, for display, an indication of the incoming communication (e.g., a graphical indication output by UID 86, an indication output by one of output devices 84, etc.), privacy module 102 may determine whether or not the incoming communication includes private information and whether or not computing device 80 is currently designated to display private information.

As shown in FIG. 3, privacy module 102 includes content analysis module 108, user account manager module 110, and user relationship module 112. In various instances, content analysis module 108 and user relationship module 112 may perform functions similar to those described with respect to content analysis module 64 and user relationship module 66 of information server system 40 shown in FIG. 2. For example, content analysis module 108 may analyze textual content of the incoming communication to determine if one or more keywords or phrases indicative of private information are included within the text of the incoming communication. As another example, content analysis module 108 may analyze image content of the incoming communication to determine if any image of the incoming communication includes private information.

As another example, content analysis module 108 may determine if the incoming communication includes a privacy flag (e.g., a bit set by the sender or messaging service that indicates whether the incoming communication includes private information). If the privacy flag is set, content analysis module 108 may determine that the incoming communication includes private information and, if the privacy flag is not set, content analysis module 108 may determine that the incoming communication does not include private information. As another example, content analysis module 108 may determine whether or not the incoming communication includes private information based on the type of emoji included within the incoming communication. In general, emoji is a Unicode symbol for something, such as an emotion or action. In some examples, based on the emotion and/or action associated with the emjoi included in the incoming communication, content analysis module 108 may determine whether or not the incoming communication includes private information.

User relationship module 112 may determine a relationship between the sender and the recipient of the incoming communication and, based on the relationship, determine that the incoming communication includes private information. The relationship may be familial, spousal, or other interpersonal-type relationship between the second and recipient. In some instances, the relationship may be determined based on social network information, stored contact information, user-configured relationship information, etc. information. Based on the relationship between the sender and the recipient, user relationship module 66 may determine that the incoming communication includes private information. For example, if the sender and recipient are married, the incoming communication may be marked as a private communication. As another example, if the sender is a business and the recipient is a customer of the business, user relationship module 66 may determine that the incoming communication does not include private information.

User account manager module 110 may determine which user account is active at computing device 80. In some examples, computing device 80 may be configured with different user accounts for different users (e.g., one for each member of a family, a personal account and a work account for the same user, etc.). The incoming communication may be directed to a user associated with one of the user accounts. User account management module 110 may determine a user account associated with the incoming communication and determine if the currently active user account is the user account associated with the incoming communication. The currently active user account is the user account that is currently authenticated (e.g., unlocked). In some examples, computing device 80 may be in a locked stated such that no user account is a currently active user account. In these examples, user account management module 110 may determine that no user account is currently active and provide and provide such an indication to privacy module 44.

Privacy module 44 may determine whether or not computing device 80 should output at least an indication of the incoming communication based not only on determinations made by text analysis module 108, user account manager module 110, and user relationship module 112, but also based on determinations made by presence detection module 104. As shown in FIG. 3, presence detection module 104 includes face detection module 114 and audio detection module 116. In general, presence detection module 104 may determine whether the user is in control of computing device 80, whether the user is currently looking at computing device 80, and whether any other user is likely currently looking at computing device 80.

Face detection module 114 may receive image data captured by one of input devices 90 (e.g., video data, still image data, etc. captured by a camera) and determine if the image data includes one or more individuals. In some examples, face detection module 114 may determine if the image data includes one or more faces. If the image data includes more than one face, face detection module 114 may determine that someone other than the user associated with computing device 80 is likely viewing the display and would like view any private information that may be output by computing device 80. Accordingly, face detection module 114, in these examples, may determine that computing device 80 is not currently designated to output private information. In other examples, face detection module 114 may determine that the image data includes only one face. Responsive to determining that only one face is included in the image data, face detection module 114 may perform facial recognition techniques to determine whether the face is the user associated with computing device 80. If the face is not the user associated with computing device 80, face detection module 114 may determine that computing device 80 is not currently designated to output private information. If the face is the user associated with computing device 80, face detection module 114 may determine that computing device 80 is currently designated to output private information.

Audio detection module 116 may analyze ambient audio data captured by one of input devices 90 (e.g., a microphone). The audio data may include audio level information and/or the captured audio itself. In some examples, audio detection module 116 may analyze the audio data to determine if voices associated with more than one user are included in the audio data. If more than one voice is detected in the audio data, audio detection module 116 may determine that computing device 80 is not currently designated to output private information. Audio detection module 116 may also analyze the audio data to determine if a voice captured in the audio data is the voice of the user associated with computing device 80. For example, audio detection module 116 may perform audio waveform analysis to compare voice captured in the audio data to a sample of the user's voice. If audio detection module 116 determines that the voice captured in the audio data matches the user's voice, audio detection module 116 may determine that computing device 80 is currently designated to output private information.

Presence detection module 104 may also determine if computing device 80 is currently within the user's control based on information received from one or more sensors 92. For example, in instances where computing device 80 is a wearable computing device and sensors 92 includes a clasp sensor and a sensor that detects motion (e.g., a gyroscope, accelerometer, etc.), presence detection module 104 may determine whether or not the user is currently wearing computing device 80. As one example, if the clasp sensor indicates that the clasp is closed and the motion sensors indicates that computing device 80 has recently moved, presence detection module 104 may determine that the user is currently wearing computing device 80 and, based on this determination, may determine that computing device 80 is currently designated to display private information. As another example, in instances where computing device 80 is a smart phone and sensors 92 include at least one sensor that detection motion, presence detection module 104 may determine whether or not the user is using the phone. For instance, if the phone is in a locked stated and the sensor data indicates that the phone is moving, presence detection module 104 may determine that the user is not currently using the phone and may determine that computing device 80 is not currently designated to output private information. If the phone is in an unlocked stated and is not currently moving or moving in a manner consistent with being held by the user, presence detection module 104 may determine that the user is currently using the phone and may determine that computing device 80 is currently designated to output private information.

In some examples, presence detection module 104 may also determine whether or not computing device 80 is currently designated to output private information based at least in part on other devices located proximate to computing device 80. Other devices may be proximate to computing device 80 if the other devices are physically located within a threshold distance of computing device 80 (e.g., within 10 feet, 50 feet, etc.), on the same wireless network as computing device 80, reachable via Bluetooth, etc. Presence detection module 104 may identify other devices on the same network, reachable via Bluetooth, etc. and determine whether the devices are associated with the user or other users. For example, if there are multiple different devices on the same wireless network as computing device 80 and the different devices are not associated with the user, presence detection module 104 may determine that computing device 80 is not currently designated to output private information. If the different devices are associated with the user or if presence detection module 104 does not identify any other devices as being proximate to computing device 80, presence detection module 104 may determine that computing device 80 is currently designated to output private information.

Privacy module 102 may also receive location information from device location module 118. Device location module 118 may perform functions similar to those of device location module 62 shown in FIG. 2. For example, device location module 118 may receive location information from one of sensors 92 (e.g., a GPS sensor) and determine the current location of computing device 80. In some examples, device location module 118 may associate a location type to a current location of computing device 80. For example, if computing device 80 is at a location corresponding to a workplace of the recipient, device location module 118 may apply a "work" location type to the location of computing device. As another example, if computing device 80 is at a location corresponding to a home of the recipient, device location module 118 may apply a "home" location type to the location of computing device 80. As another example, if computing device 80 is at a location corresponding to a public business, device location module 118 may apply a "public" location type to the location of computing device 80. In any of the examples, device location module 118 may provide, to privacy module 102, a respective location type in addition to or instead of a respective current location of one or more of computing devices 80.

Privacy module 102 may make a final determination as to whether or not the incoming communication includes private information and whether or not computing device 80 is currently designated to output private information based on any combination of the determinations made by modules 104, 108, 110, 112, 114, 116, and 118 as well as any other non-final determination made by privacy module 102. In general, a "non-final" determination is any determination as to whether or not the incoming communication includes private information and/or whether or not computing device 80 is currently designated to display private information other than the final determination that ultimately governs whether or not the private information is displayed by computing device 80. A final determination is typically made by privacy module 102 based on any combination of non-final determinations.

Presence detection module 104 may provide various non-final determinations to privacy module 102. As one example, presence detection module 104 may provide, to privacy module 102, each non-final determination made by modules 114, 116, and 118 as well as any non-final determination made by presence detection module 104. As another example, presence detection module 104 may analyze the various non-final determinations and generate a single determination to provide to privacy module 102.

In making the final determination, privacy module 102 may weight each of the non-final determinations in making the file determination. For example, privacy module 102 may weight a determination made by presence detection module 104 that computing device 80 is currently designated to output private information more heavily than a determination by text analysis module 108. As another example, privacy module 102 may weight a determination by device location module that computing device 80 is currently designated to display private information (e.g., based on a determination that computing device 80 is at a "home" location) less heavily than a determination by face detection module 114 that the computing device is not currently designated to display private information (e.g., based on a determination that someone other than the user is currently looking at the display of computing device 80).

Privacy module 102 makes a final determination as to whether or not to output at least an indication of the incoming communication. Responsive to determining to output at least an indication of the incoming communication, privacy module 102 causes UI module 100 to generate a graphical indication of the incoming communication for display by UID 86. Responsive to determining not to output at least an indication of the incoming communication, privacy module 102 refrains from causing a graphical indication of the incoming communication to be output by computing device 80 and may, in various instances, cause computing device 80 to send a message to information server system 40 indicating that computing device 80 is not currently designated to output private information and/or that the incoming communication includes private information.

Figure 4:
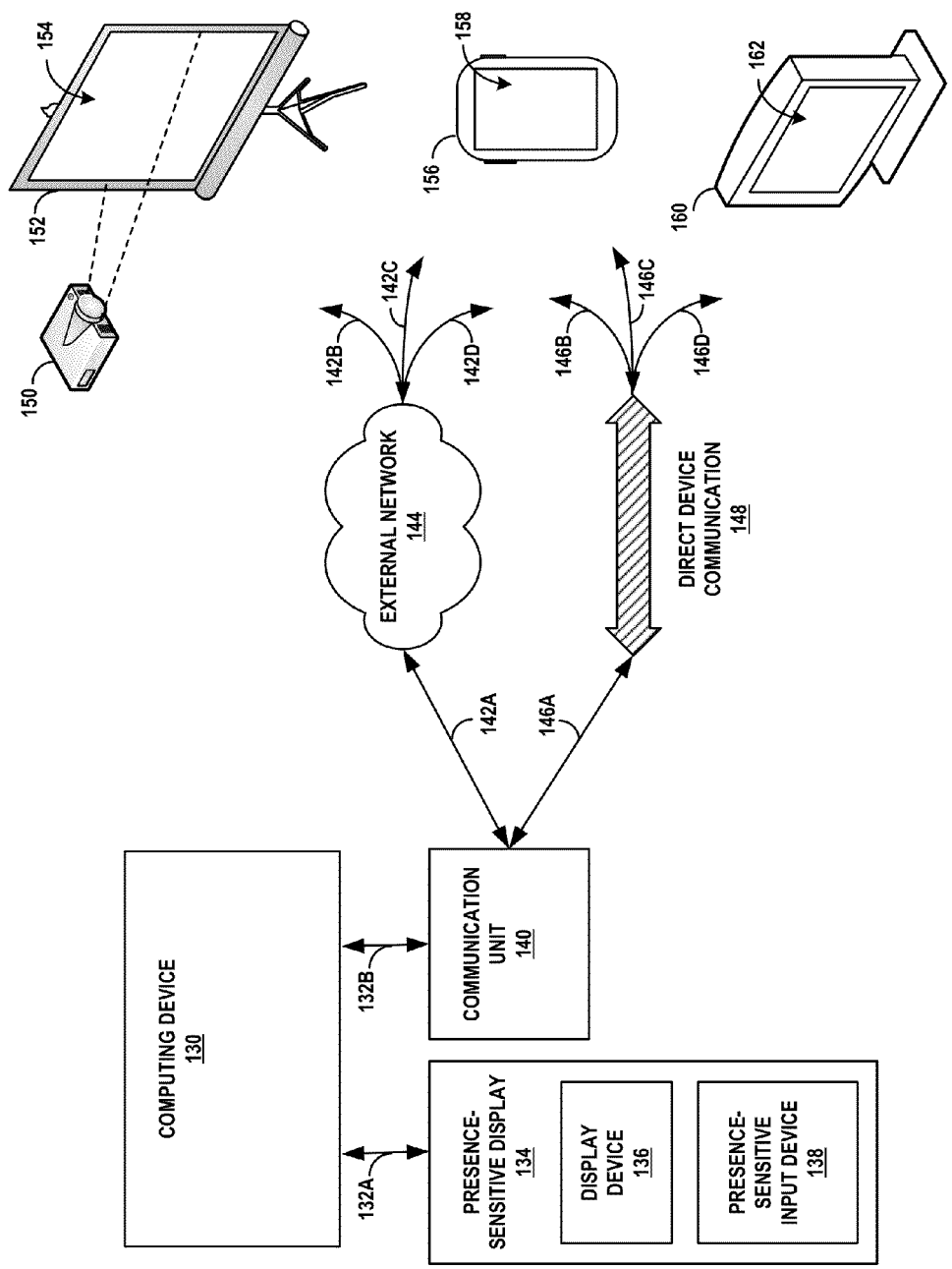
FIG. 4 is a block diagram illustrating an example computing device that outputs information for display at a remote device, in accordance with one or more techniques of the present disclosure.

FIG. 4 is a block diagram illustrating an example computing device that outputs graphical content for display at a remote device, in accordance with one or more techniques of the present disclosure. Graphical content, generally, may include any visual information that may be output for display, such as text, images, a group of moving images, etc. The example shown in FIG. 4 includes a computing device 130, presence-sensitive display 134, communication unit 140, projector 150, projector screen 152, mobile device 156, and visual display device 160. Although shown for purposes of example in FIGS. 1 and 3 as stand-alone computing devices 10 and 80, a computing device such as computing device 130 may, generally, be any component or system that includes a processor or other suitable computing environment for executing software instructions and, for example, need not include a presence-sensitive display.

As shown in the example of FIG. 4, computing device 130 may be a processor that includes functionality as described with respect to processor 82 in FIG. 3. In such examples, computing device 130 may be operatively coupled to presence-sensitive display 134 by a communication channel 132A, which may be a system bus or other suitable connection. Computing device 130 may also be operatively coupled to communication unit 140, further described below, by a communication channel 132B, which may also be a system bus or other suitable connection. Although shown separately as an example in FIG. 4, computing device 130 may be operatively coupled to presence-sensitive display 134 and communication unit 140 by any number of one or more communication channels.

In other examples, such as illustrated previously by computing devices 10 and 80 in FIGS. 1 and 3, a computing device may refer to a portable or mobile device such as mobile phones (including smart phones), wearable devices (including smart watches) laptop computers, etc. In some examples, a computing device may be a desktop computers, tablet computers, smart television platforms, cameras, personal digital assistants (PDAs), servers, mainframes, etc.

Presence-sensitive display 134, like UI devices 12 as shown in FIG. 1, may include display device 136 and presence-sensitive input device 138. Display device 136 may, for example, receive data from computing device 130 and display the graphical content. In some examples, presence-sensitive input device 138 may determine one or more user inputs (e.g., continuous gestures, multi-touch gestures, single-touch gestures, etc.) at presence-sensitive display 134 using capacitive, inductive, and/or optical recognition techniques and send indications of such user input to computing device 130 using communication channel 132A. In some examples, presence-sensitive input device 138 may be physically positioned on top of display device 136 such that, when a user positions an input unit over a graphical element displayed by display device 136, the location at which presence-sensitive input device 138 corresponds to the location of display device 136 at which the graphical element is displayed. In other examples, presence-sensitive input device 138 may be positioned physically apart from display device 136, and locations of presence-sensitive input device 138 may correspond to locations of display device 136, such that input can be made at presence-sensitive input device 138 for interacting with graphical elements displayed at corresponding locations of display device 136.

As shown in FIG. 4, computing device 130 may also include and/or be operatively coupled with communication unit 140. Communication unit 140 may include functionality of communication unit 88 as described in FIG. 3. Examples of communication unit 140 may include a network interface card, an Ethernet card, an optical transceiver, a radio frequency transceiver, or any other type of device that can send and receive information. Other examples of such communication units may include Bluetooth, 3G, and Wi-Fi radios, Universal Serial Bus (USB) interfaces, etc. Computing device 130 may also include and/or be operatively coupled with one or more other devices, e.g., input devices, output devices, memory, storage devices, etc. that are not shown in FIG. 4 for purposes of brevity and illustration.

FIG. 4 also illustrates a projector 150 and projector screen 152. Other such examples of projection devices may include electronic whiteboards, holographic display devices, and any other suitable devices for displaying graphical content. Projector 150 and projector screen 152 may include one or more communication units that enable the respective devices to communicate with computing device 130. In some examples, the one or more communication units may enable communication between projector and projector screen 152. Projector 150 may receive data from computing device 130 that includes graphical content. Projector 150, in response to receiving the data, may project the graphical content onto projector screen 152. In some examples, projector 150 may determine one or more user inputs (e.g., continuous gestures, multi-touch gestures, single-touch gestures, etc.) at projector screen using optical recognition or other suitable techniques and send indications of such user input using one or more communication units to computing device 130. In such examples, projector screen 152 may be unnecessary, and projector 150 may project graphical content on any suitable medium and detect one or more user inputs using optical recognition or other such suitable techniques.

Projector screen 152, in some examples, may include a presence-sensitive display 104. Presence-sensitive display 154 may include a subset of functionality or all of the functionality of UI devices 12 and/or UI device 86 as described in this disclosure. In some examples, presence-sensitive display 134 may include additional functionality. Projector screen 152 (e.g., an electronic whiteboard), may receive data from computing device 130 and display the graphical content. In some examples, presence-sensitive display 154 may determine one or more user inputs (e.g., continuous gestures, multi-touch gestures, single-touch gestures, etc.) at projector screen 152 using capacitive, inductive, and/or optical recognition techniques and send indications of such user input using one or more communication units to computing device 130.

FIG. 4 also illustrates mobile device 156 and visual display device 160. Mobile device 156 and visual display device 160 may each include computing and connectivity capabilities. Examples of mobile device 156 may include e-reader devices, convertible notebook devices, hybrid slate devices, wearable devices, etc. Examples of visual display device 160 may include other semi-stationary devices such as televisions, computer monitors, etc. As shown in FIG. 4, mobile device 156 may include a presence-sensitive display 158. Visual display device 160 may include a presence-sensitive display 162. Presence-sensitive displays 158, 162 may include a subset of functionality or all of the functionality of UI devices 12 and/or UI device 86 as described in this disclosure. In some examples, presence-sensitive displays 158, 162 may include additional functionality. In any case, presence-sensitive display 162, for example, may receive data from computing device 80 and display the graphical content. In some examples, presence-sensitive display 162 may determine one or more user inputs (e.g., continuous gestures, multi-touch gestures, single-touch gestures, etc.) at projector screen using capacitive, inductive, and/or optical recognition techniques and send indications of such user input using one or more communication units to computing device 130.

As described above, in some examples, computing device 130 may output graphical content for display at presence-sensitive display 134 that is coupled to computing device 130 by a system bus or other suitable communication channel. Computing device 130 may also output graphical content for display at one or more remote devices, such as projector 150, projector screen 152, mobile device 156, and visual display device 160. For instance, computing device 130 may execute one or more instructions to generate and/or modify graphical content in accordance with techniques of the present disclosure. Computing device 130 may output the data that includes the graphical content to a communication unit of computing device 130, such as communication unit 140. Communication unit 140 may send the data to one or more of the remote devices, such as projector 150, projector screen 152, mobile device 156, and/or visual display device 160. In this way, computing device 130 may output the graphical content for display at one or more of the remote devices. In some examples, one or more of the remote devices may output the graphical content at a presence-sensitive display that is included in and/or operatively coupled to the respective remote devices.

In some examples, computing device 130 may not output graphical content at presence-sensitive display 134 that is operatively coupled to computing device 130. In other examples, computing device 130 may output graphical content for display at both a presence-sensitive display 134 that is coupled to computing device 130 by communication channel 132A, and at one or more remote devices. In such examples, the graphical content may be displayed substantially contemporaneously at each respective device. For instance, some delay may be introduced by the communication latency to send the data that includes the graphical content to the remote device. In some examples, graphical content generated by computing device 130 and output for display at presence-sensitive display 134 may be different than graphical content display output for display at one or more remote devices.

Computing device 130 may send and receive data using any suitable communication techniques. For example, computing device 130 may be operatively coupled to external network 144 using network link 142A. Each of the remote devices illustrated in FIG. 4 may be operatively coupled to network external network 144 by one of respective network links 142B, 142C, and 142D. External network 144 may include network hubs, network switches, network routers, etc., that are operatively inter-coupled thereby providing for the exchange of information between computing device 130 and the remote devices illustrated in FIG. 4. In some examples, network links 142A-142D may be Ethernet, ATM or other network connections. Such connections may be wireless and/or wired connections.

In some examples, computing device 130 may be operatively coupled to one or more of the remote devices included in FIG. 4 using direct device communication 148. Direct device communication 148 may include communications through which computing device 130 sends and receives data directly with a remote device, using wired or wireless communication. That is, in some examples of direct device communication 148, data sent by computing device 130 may not be forwarded by one or more additional devices before being received at the remote device, and vice-versa. Examples of direct device communication 138 may include Bluetooth, Near-Field Communication, Universal Serial Bus, Wi-Fi, infrared, etc. One or more of the remote devices illustrated in FIG. 4 may be operatively coupled with computing device 130 by communication links 146A-146D. In some examples, communication links 146A-146D may be connections using Bluetooth, Near-Field Communication, Universal Serial Bus, infrared, etc. Such connections may be wireless and/or wired connections.

In accordance with techniques of the disclosure, computing device 130 may be operatively coupled to visual display device 160 using external network 144. Computing device 130 may determine that only the user is currently viewing visual display device 160 and/or that the incoming communication does not include private information and, in response, output a graphical indication of an incoming communication for display at presence-sensitive display 162. For instance, computing device 130 may send data that includes a representation of the graphical indication to communication unit 140. Communication unit 140 may send the data that includes the representation of the graphical indication to visual display device 160 using external network 144. Visual display device 160, in response to receiving the data using external network 94, may cause presence-sensitive display 162 to output the graphical indication.

Figure 5:
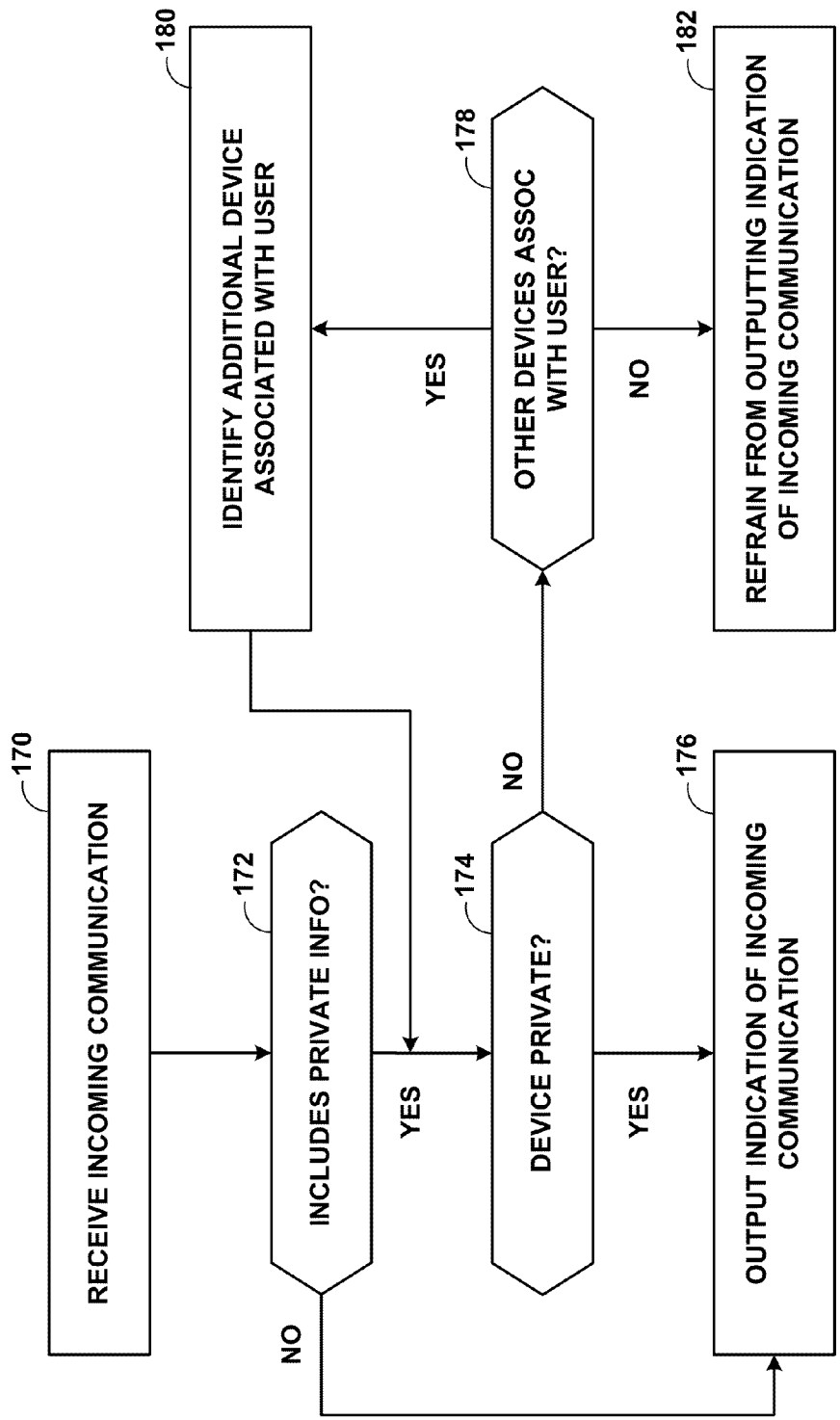
FIG. 5 is a flow diagram illustrating example operations of a computing device to manage the display of private information at a wearable device, in accordance with one or more techniques of the present disclosure.

FIG. 5 is a flow diagram illustrating example operations of a computing device to manage the display of private information, in accordance with one or more techniques of the present disclosure. The techniques of FIG. 5 may be performed by one or more processors of a computing device, such as computing devices 10, 80, and 130 illustrated in FIGS. 1, 3, and 4. For purposes of illustration, the techniques of FIG. 5 are described within the context of computing system 1 of FIG. 1, information server system 40 of FIG. 2, and computing device 80 and 130 of FIGS. 3 and 4, although computing devices having different configurations may perform the techniques of FIG. 5.

In accordance with one or more techniques of the disclosure, computing device 10A may receive an indication of an incoming communication (170). The incoming communication may be received from, for example, a component of computing device 10A, an external server (e.g., information server system 40), or another one of computing devices 10 (e.g., computing device 10N). Privacy module 24A of computing device 10A may determine whether or not the incoming communication includes private information (172). As discussed above, privacy module 24A may determine that the incoming communication includes private information based on, for example, one or more predefined privacy settings, the sender of the incoming communication, and the content of the incoming communication, among other things. If the incoming communication does not include private information ("NO" branch of 172), computing device 10A may be configured to output at least an indication of the incoming communication (176).

In examples where the incoming communication includes private information ("YES" branch of 172), privacy module 24A may determine whether or not computing device 10A is currently designated to display private information (174). Privacy module 24A may determine whether or not computing device 10A is currently designated to display private information based at least in part on whether one or more individuals other than the user associated with computing device 10A are currently view a display of computing device 10A (e.g., as determined by presence detection module 22A), whether the user is currently using computing device 10A, whether computing device 10A is currently being used for a presentation based on the current location of computing device 10A (e.g., at the user's workplace), the currently active application (e.g., presentation software), the current configuration of computing device 10A (e.g., connected to an external display device, such as a projector), etc. as well as any combination thereof.

Responsive to determining that computing device 10A is currently designated to display private information ("YES" branch of 174), computing device 10A outputs at least an indication of the incoming communication (176). Responsive to determining that computing device 10A is not currently designated to display private information ("NO" branch of 174), in some examples, computing device 10A may determine if there are other computing devices associated with the same user that is associated with computing device 10A (178), while, in other examples, information server system 40 determines may determine if there are other computing devices associated with the same user that is associated with computing device 10A (178). In either example, if no other computing devices are associated with the user, computing device refrains from outputting at least an indication of the incoming communication (182).

In instances where there are other computing devices associated with the user (e.g., computing device 10N) ("YES" branch of 178), computing device 10A and/or information server system 40 identifies an additional computing device associated with the user (180). In some examples, information server system 40 determines whether the identified computing device (e.g., computing device 10N) is currently designated to display private information (174). In some examples, the identified computing device receives an indication of the incoming communication and determines whether or not it is currently designated to display private information (174). Typically, the process continues until either at least an indication of the incoming communication is output by a computing device or until it is determined that there are no computing devices associated with the user that are currently designated to display private information.

Example 1

A method comprising: determining, by a computing device, whether the computing device is currently designated to display private information by at least determining whether one or more individuals other than a user to whom the incoming communication is directed are likely to view the indication of the incoming communication if the indication of the incoming communication is output by the computing device; receiving, by the computing device, an incoming communication; determining that the incoming communication includes particular private information; if the computing device is currently designated to display private information, outputting, by the computing device and for display, an indication of the incoming communication; and if the computing device is not currently designated to display private information, refraining from outputting, by the computing device and for display, the indication of the incoming communication.

Example 2

The method of example 1, wherein the computing device is a first computing device associated with a user, the method further comprising: responsive to determining that the first computing device is not currently designated to display private information: determining that a second computing device associated with the user is currently designated to display private information; and providing, by the first computing device and to the second computing device, the indication of the incoming communication to the second computing device.

Example 3

The method of any of examples 1-2, wherein the determining whether one or more individuals other than a user to whom the incoming communication is directed are likely to view the indication of the incoming communication if the indication of the incoming communication is output by the computing device is based at least in part on a current location of the computing device.

Example 4

The method of any of example 3, determining, based at least in part on the current location of the computing device, whether one or more individuals other than a user to whom the incoming communication is directed are likely to view the indication of the incoming communication if the indication of the incoming communication is output by the computing device comprises: responsive to determining that the current location type corresponds to a public location type, determining that the computing device is not currently designated to output private information; and responsive to determining that the current location corresponds to a home location type, determining that the computing device is currently designated to output private information.

Example 5

The method of any of examples 1-4, wherein determining whether one or more individuals other than a user to whom the incoming communication is directed are likely to view the indication of the incoming communication if the indication of the incoming communication is output by the computing device comprises: determining, by the computing device, a currently active user account of the computing device; responsive to determining that the user to whom the incoming communication is directed is associated with the currently active user account, determining that the computing device is currently designated to display private information; and responsive to determining that the user to whom the incoming communication is directed is not associated with the currently active user account, determining that the computing device is not currently designated to display private information.

Example 6

The method of any of examples 1-5, wherein determining whether one or more individuals other than a user to whom the incoming communication is directed are likely to view the indication of the incoming communication if the indication of the incoming communication is output by the computing device comprises: determining, by the computing device, whether the computing device is currently being worn; responsive to determining that the computing device is currently being worn, determining that the computing device is currently designated to display private information; and responsive to determining that the computing device is not currently being worn, determining that the computing device is not currently designated to display private information.

Example 7

The method of any of examples 1-6, wherein determining whether one or more individuals other than a user to whom the incoming communication is directed are likely to view the indication of the incoming communication if the indication of the incoming communication is output by the computing device comprises: determining, by the computing device, whether one or more other devices are located proximate to the computing device; responsive to determining that no other devices are located proximate to the computing device, determining that the computing device is currently designated to display private information; and responsive to determining that the one or more other devices are located proximate to the computing device: responsive to determining that none of the one or more other devices is associated with the user to whom the incoming communication is directed, determining that the computing device is currently designated to display private information; and responsive to determining that at least one of the one or more other devices is associated with a user other than the user to whom the incoming communication is directed, determining that the computing device is not currently designated to display private information.

Example 8

The method of any of examples 1-7, wherein determining whether one or more individuals other than a user to whom the incoming communication is directed are likely to view the indication of the incoming communication if the indication of the incoming communication is output by the computing device comprises: capturing, by the computing device, audio data; determining, by the computing device, whether the audio data includes one or more voices associated with individuals other than a user associated with the computing device; responsive to determining that the audio data includes the one or more voices, determining that the computing device is not currently designated to display private information; and responsive to determining that the audio data does not include the one or more voices, determining that the computing device is currently designated to display private information.

Example 9

The method of any of examples 1-8, wherein determining whether one or more individuals other than a user to whom the incoming communication is directed are likely to view the indication of the incoming communication if the indication of the incoming communication is output by the computing device comprises: capturing, by the computing device, visual data; determining, by the computing device, whether the visual data includes at least one face other than a face of a user associated with the computing device; responsive to determining that the visual data includes the at least one face other than the face of the user associated with the computing device, determining that the computing device is not currently designated to display private information; and responsive to determining that the visual data does not include the at least one face other than the face of the user associated with the computing device, determining that the computing device is currently designated to display private information.

Example 10

The method of any of examples 1-9, wherein determining that the incoming communication includes content that is private information comprises: identifying, by the computing device, one or more objects included in image data of the incoming communication; and determining, based on the one or more objects, that the incoming communication includes private information.

Example 11

The method of any of examples 1-10, wherein determining that the incoming communication includes content that is private information is based on one or more of a sender of the incoming communication, a type of relationship between a user associated with the computing device and the sender of the incoming communication, content of the incoming communication, and a privacy flag included in the incoming communication.

Example 12

A computing device comprising: one or more processors; and at least one module executable by the one or more processors to: determine whether the computing device is currently designated to display private information by at least determining whether one or more individuals other than a user to whom the incoming communication is directed are likely to view the indication of the incoming communication if the indication of the incoming communication is output by the computing device; receive an incoming communication; determine that the incoming communication includes content that is private information; if the computing device is currently designated to display private information, output, for display, an indication of the incoming communication; and if the computing device is not currently designated to display private information, refrain from outputting, for display, the indication of the incoming communication.

Example 13

The computing device of example 12, wherein the computing device is a first computing device associated with a user, and wherein the at least one module is further executable by the one or more processors to: responsive to determining that the first computing device is not currently designated to display private information: determine that a second computing device associated with the user is currently designated to display private information; and provide, to the second computing device, the indication of the incoming communication to the second computing device.

Example 14

The computing device of any of examples 12-13, wherein the at least one module is further executable by the one or more processors to: determine a current location of the computing device; and determine, based at least in part on the current location, whether the one or more individuals other than the user to whom the incoming communication is directed are likely to view the indication of the incoming communication if the indication of the incoming communication is output by the computing device.

Example 15

The computing device of example 14, wherein the at least one module is further operably by the one or more processors to: responsive to determining that the current location type corresponds to a public location type, determine that the computing device is not currently designated to output private information; and responsive to determining that the current location corresponds to a home location type, determine that the computing device is currently designated to output private information.

Example 16

The computing device of any of examples 12-15, wherein the at least one module is further executable by the one or more processors to determine a currently active user account of the computing device; responsive to determining that the user to whom the incoming communication is directed is associated with the currently active user account, determining that the computing device is currently designated to display private information; and responsive to determining that the user to whom the incoming communication is directed is not associated with the currently active user account, determining that the computing device is not currently designated to display private information.

Example 17

The computing device of any of examples 12-16, wherein the at least one module is further executable by the one or more processors to: determine whether the computing device is currently being worn; responsive to determining that the computing device is currently being worn, determine that the computing device is currently designated to display private information; and responsive to determining that the computing device is not currently being worn, determine that the computing device is not currently designated to display private information.

Example 18

The computing device of any of examples 12-17, wherein the at least one module is further operably by the one or more processors to: determine whether one or more other devices are located proximate to the computing device; responsive to determining that no other devices are located proximate to the computing device, determine that the computing device is currently designated to display private information; and responsive to determining that the one or more other devices are located proximate to the computing device: responsive to determining that none of the one or more other devices is associated with the user to whom the incoming communication is directed, determine that the computing device is currently designated to display private information; and responsive to determining that at least one of the one or more other devices is associated with a user other than the user to whom the incoming communication is directed, determine that the computing device is not currently designated to display private information.

Example 19

The computing device of any of examples 12-18, wherein the at least one module is further operably by the one or more processors to: capture audio data; determine whether the audio data includes one or more voices associated with individuals other than a user associated with the computing device; responsive to determining that the audio data includes the one or more voices, determine that the computing device is not currently designated to display private information; and responsive to determining that the audio data does not include the one or more voices, determine that the computing device is currently designated to display private information.

Example 20

The computing device of any of examples 12-19, wherein the at least one module is further operably by the one or more processors to: capture visual data; determine whether the visual data includes at least one face other than a face of a user associated with the computing device; responsive to determining that the visual data includes the at least one face other than the face of the user associated with the computing device, determine that the computing device is not currently designated to display private information; and responsive to determining that the visual data does not include the at least one face other than the face of the user associated with the computing device, determine that the computing device is currently designated to display private information.

Example 21

The computing device of any of examples 12-20, wherein the at least one module is further operably by the one or more processors to: identify one or more objects included in image data of the incoming communication; and determine, based on the one or more objects, whether the incoming communication includes private information.

Example 22

The computing device of any of examples 12-21, wherein the at least one module is further operably by the one or more processors to: determine whether the incoming communication includes private information based at least in part on one or more of a sender of the incoming communication, a type of relationship between a user associated with the computing device and the sender of the incoming communication, content of the incoming communication, and a privacy flag included in the incoming communication.

Example 23

A computing device comprising means for performing the method recited by any of examples 1-11.

Example 24

A computer-readable storage medium comprising instructions that, when executed, configure one or more processors of a computing system to: determine whether the computing device is currently designated to display private information by at least determining whether one or more individuals other than a user to whom the incoming communication is directed are likely to view the indication of the incoming communication if the indication of the incoming communication is output by the computing device; receive an incoming communication; determine that the incoming communication includes content that is private information; if the computing device is currently designated to display private information, output, for display, an indication of the incoming communication; and if the computing device is not currently designated to display private information, refrain from outputting, for display, the indication of the incoming communication.

Example 25

A computer-readable storage medium comprising instructions that, when executed, cause one or more processors of a computing device to perform the method recited by any of examples 1-11.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium encoded, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

Various examples of the invention have been described. These and other examples are within the scope of the following claims.

What is claimed is:

1. A method comprising:
receiving, by a computing device, an incoming communication;
determining that the incoming communication includes private information;
determining, by a computing device, whether the computing device is currently designated to display private information by at least:
responsive to determining that no other devices are located proximate to the computing device, determining that the computing device is currently designated to display private information;
responsive to determining that the one or more other devices are located proximate to the computing device:
responsive to determining that the one or more other devices are associated with the user to whom the incoming communication is directed, determining that the computing device is currently designated to display private information; and
responsive to determining that at least one of the one or more other devices is associated with a user other than the user to whom the incoming communication is directed, determining that the computing device is not currently designated to display private information;
if the computing device is currently designated to display private information, outputting, by the computing device and for display, the indication of the incoming communication; and
if the computing device is not currently designated to display private information, refraining from outputting, by the computing device and for display, the indication of the incoming communication.

2. The method of claim 1, wherein the computing device is a first computing device associated with a user, the method further comprising:
responsive to determining that the first computing device is not currently designated to display private information:
determining that a second computing device associated with the user is currently designated to display private information; and
providing, by the first computing device and to the second computing device, the indication of the incoming communication.

3. The method of claim 1, wherein the determining whether one or more other devices are located proximate to the computing device is based at least in part on a current location of the computing device.

4. The method of claim 3, wherein determining, based at least in part on the current location of the computing device, whether one or more other devices are located proximate to the computing device comprises:
responsive to determining that the current location type corresponds to a public location type, determining that the computing device is not currently designated to output private information; and
responsive to determining that the current location corresponds to a home location type, determining that the computing device is currently designated to output private information.

5. The method of claim 1, wherein determining whether the computing device is currently designated to display private information further comprises:
determining, by the computing device, a currently active user account of the computing device;
responsive to determining that the user to whom the incoming communication is directed is associated with the currently active user account, determining that the computing device is currently designated to display private information; and
responsive to determining that the user to whom the incoming communication is directed is not associated with the currently active user account, determining that the computing device is not currently designated to display private information.

6. The method of claim 1, wherein determining whether the computing device is currently designated to display private information further comprises:
determining, by the computing device, whether the computing device is currently being worn;
responsive to determining that the computing device is currently being worn, determining that the computing device is currently designated to display private information; and
responsive to determining that the computing device is not currently being worn, determining that the computing device is not currently designated to display private information.

7. The method of claim 1, wherein determining whether the computing device is currently designated to display private information further comprises:
capturing, by the computing device, audio data;
determining, by the computing device, whether the audio data includes one or more voices associated with individuals other than a user associated with the computing device;
responsive to determining that the audio data includes the one or more voices, determining that the computing device is not currently designated to display private information; and responsive to determining that the audio data does not include the one or more voices, determining that the computing device is currently designated to display private information.

8. The method of claim 1, wherein determining whether the computing device is currently designated to display private information further comprises:
capturing, by the computing device, visual data;
determining, by the computing device, whether the visual data includes at least one face other than a face of a user associated with the computing device;
responsive to determining that the visual data includes the at least one face other than the face of the user associated with the computing device, determining that the computing device is not currently designated to display private information; and
responsive to determining that the visual data does not include the at least one face other than the face of the user associated with the computing device, determining that the computing device is currently designated to display private information.

9. The method of claim 1, wherein determining that the incoming communication includes content that is private information comprises:
identifying, by the computing device, one or more objects included in image data of the incoming communication; and
determining, based on the one or more objects, that the incoming communication includes private information.

10. The method of claim 1, wherein the determining that the incoming communication includes private information is based on one or more of a sender of the incoming communication, a type of relationship between a user associated with the computing device and the sender of the incoming communication, content of the incoming communication, and a privacy flag included in the incoming communication.

11. A computing device comprising:
one or more processors; and
at least one module operable by the one or more processors to:
receive an incoming communication;
determine that the incoming communication includes content that is private information;
determine whether the computing device is currently designated to display private information by at least;
responsive to determining that no other devices are located proximate to the computing device, determine that the computing device is currently designated to display private information;
responsive to determining that the one or more other devices are located proximate to the computing device:
responsive to determining that the one or more other devices are associated with the user to whom the incoming communication is directed, determine that the computing device is currently designated to display private information; and
responsive to determining that at least one of the one or more other devices is associated with a user other than the user to whom the incoming communication is directed, determine that the computing device is not currently designated to display private information;
if the computing device is currently designated to display private information, output, for display, the indication of the incoming communication; and
if the computing device is not currently designated to display private information, refrain from outputting, for display, the indication of the incoming communication.

12. The computing device of claim 11, wherein the computing device is a first computing device associated with a user, and wherein the at least one module is further operably by the one or more processors to:
responsive to determining that the first computing device is not currently designated to display private information:
determine that a second computing device associated with the user is currently designated to display private information; and
provide, to the second computing device, the indication of the incoming communication.

13. The computing device of claim 11, wherein the at least one module is further operably by the one or more processors to:
determine a current location of the computing device; and
determine, based at least in part on the current location, whether the one or more other devices are located proximate to the computing device.

14. The computing device of claim 13, wherein the at least one module is further operably by the one or more processors to:
responsive to determining that the current location type corresponds to a public location type, determine that the computing device is not currently designated to output private information; and
responsive to determining that the current location corresponds to a home location type, determine that the computing device is currently designated to output private information.

15. The computing device of claim 11, wherein the at least one module is further operably by the one or more processors to:
determine a currently active user account of the computing device;
responsive to determining that the user to whom the incoming communication is directed is associated with the currently active user account, determining that the computing device is currently designated to display private information; and
responsive to determining that the user to whom the incoming communication is directed is not associated with the currently active user account, determining that the computing device is not currently designated to display private information.

16. The computing device of claim 11, wherein the at least one module is further operably by the one or more processors to:
determine whether the computing device is currently being worn;
responsive to determining that the computing device is currently being worn, determine that the computing device is currently designated to display private information; and
responsive to determining that the computing device is not currently being worn, determine that the computing device is not currently designated to display private information.

17. The computing device of claim 11, wherein the at least one module is further operably by the one or more processors to:
capture audio data;
determine whether the audio data includes one or more voices associated with individuals other than a user associated with the computing device;

responsive to determining that the audio data includes the one or more voices, determine that the computing device is not currently designated to display private information; and responsive to determining that the audio data does not include the one or more voices, determine that the computing device is currently designated to display private information.

18. The computing device of claim 11, wherein the at least one module is further operably by the one or more processors to:

capture visual data;

determine whether the visual data includes at least one face other than a face of a user associated with the computing device;

responsive to determining that the visual data includes the at least one face other than the face of the user associated with the computing device, determine that the computing device is not currently designated to display private information; and responsive to determining that the visual data does not include the at least one face other than the face of the user associated with the computing device, determine that the computing device is currently designated to display private information.

19. The computing device of claim 11, wherein the at least one module is further operably by the one or more processors to:

identify one or more objects included in image data of the incoming communication; and determine, based on the one or more objects, whether the incoming communication includes private information.

20. The computing device of claim 11, wherein the at least one module is further operably by the one or more processors to:

determine whether the incoming communication includes private information based at least in part on one or more of a sender of the incoming communication, a type of relationship between a user associated with the computing device and the sender of the incoming communication, content of the incoming communication, and a privacy flag included in the incoming communication.

21. A computer-readable storage medium comprising instructions that, when executed, configure one or more processors of a computing system to:

receive an incoming communication;

determine that the incoming communication includes content that is private information;

determine whether the computing device is currently designated to display private information by at least:

responsive to determining that no other devices are located proximate to the computing device, determining that the computing device is currently designated to display private information;

responsive to determining that the one or more other devices are located proximate to the computing device:

responsive to determining that the one or more other devices are associated with the user to whom the incoming communication is directed, determining that the computing device is currently designated to display private information; and responsive to determining that at least one of the one or more other devices is associated with a user other than the user to whom the incoming communication is directed, determining that the computing device is not currently designated to display private information;

if the computing device is currently designated to display private information, output, for display, the indication of the incoming communication; and if the computing device is not currently designated to display private information, refrain from outputting, for display, the indication of the incoming communication.

* * * * *